(12) United States Patent
Barton et al.

(10) Patent No.: US 12,532,377 B2
(45) Date of Patent: Jan. 20, 2026

(54) STATION ASSOCIATION CONTINUITY ACROSS ACCESS POINT MAC ADDRESS ROTATIONS

(71) Applicant: Cisco Technology, Inc., San Jose, CA (US)

(72) Inventors: Robert E. Barton, Richmond (CA); Jerome Henry, Pittsboro, NC (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 491 days.

(21) Appl. No.: 17/711,488

(22) Filed: Apr. 1, 2022

(65) Prior Publication Data

US 2023/0319943 A1 Oct. 5, 2023

(51) Int. Cl.
*H04L 61/5038* (2022.01)
*H04L 1/1607* (2023.01)
*H04W 76/25* (2018.01)

(52) U.S. Cl.
CPC ........... *H04W 76/25* (2018.02); *H04L 1/1685* (2013.01); *H04L 61/5038* (2022.05)

(58) Field of Classification Search
CPC ... H04W 76/25; H04L 61/5038; H04L 1/1685
See application file for complete search history.

(56) References Cited

U.S. PATENT DOCUMENTS

2012/0213211 A1  8/2012  Remaker

2016/0135053 A1* 5/2016 Lee .................. H04W 12/02
726/7
2017/0086251 A1* 3/2017 Valliappan ............ H04W 72/54
(Continued)

FOREIGN PATENT DOCUMENTS

WO  2020148062 A1  7/2020
WO  2020221465 A1  11/2020
WO  2020229409 A1  11/2020

OTHER PUBLICATIONS

IEEE 802.11 Wireless LAN Standard : MAC, Xerandy, CS-1699 Wireless Networks : 2018, University of Pittsburgh, chrome-extension://efaidnbmnnnibpcajpcglclefindmkaj/https://people.cs.pitt.edu/~xex1/Courses/WirelessNets/Materials/Feb13-WirelessLAN-2-v2.pdf (Year: 2018).*

(Continued)

*Primary Examiner* — Hassan A Phillips
*Assistant Examiner* — Sang C Lee
(74) *Attorney, Agent, or Firm* — Edell, Shapiro & Finnan, LLC

(57) ABSTRACT

A method comprising: at an access point configured with a first basic service set identifier (BSSID): performing an association process by which one or more wireless stations wirelessly associate to the access point using the first BSSID; and while the one or more wireless stations remain associated to the access point: sending, to the one or more wireless stations, a protected management frame configured to indicate that the access point will rotate from the first BSSID to a second BSSID; after sending, rotating from the first BSSID to the second BSSID while maintaining continuity of association to the one or more wireless stations; and after rotating, communicating with the one or more wireless stations using the second BSSID.

20 Claims, 9 Drawing Sheets

(56) References Cited

U.S. PATENT DOCUMENTS

| | | | |
|---|---|---|---|
| 2018/0279209 A1* | 9/2018 | Fang | H04L 27/261 |
| 2019/0208470 A1* | 7/2019 | Asterjadhi | H04W 52/0229 |
| 2020/0107273 A1 | 4/2020 | Park et al. | |
| 2021/0014911 A1* | 1/2021 | Patil | H04W 12/73 |
| 2021/0068172 A1 | 3/2021 | Jeong et al. | |
| 2021/0076412 A1* | 3/2021 | Naribole | H04W 76/15 |
| 2021/0168115 A1* | 6/2021 | de la Oliva | H04W 12/06 |
| 2021/0266890 A1* | 8/2021 | Chu | H04W 72/51 |
| 2021/0321243 A1* | 10/2021 | Patil | H04W 76/15 |
| 2021/0337613 A1 | 10/2021 | Seok et al. | |
| 2021/0368322 A1* | 11/2021 | Seok | H04W 12/041 |
| 2021/0377856 A1* | 12/2021 | Chu | H04W 52/0216 |
| 2022/0039183 A1 | 2/2022 | Chu et al. | |

OTHER PUBLICATIONS

Cisco, "Enterprise Mobility 8.1 Design Guide," https://www.cisco.com/c/en/us/td/docs/wireless/controller/8-1/Enterprise-Mobility-8-1-Design-Guide/Enterprise_Mobility_8-1_Deployment_Guide.html, Nov. 2020, 484 pages.

* cited by examiner

STATION ASSOCIATION CONTINUITY ACROSS ACCESS POINT MAC ADDRESS ROTATIONS

TECHNICAL FIELD

The present disclosure relates to secure networking.

BACKGROUND

Many operating systems implement device address rotation methods that are designed to improve user privacy. As the IEEE 802.11 standards (also referred to as the Wi-Fi® standards (hereinafter "Wi-Fi")) move toward randomized and changing media access control (MAC) (RCM) addresses (referred to as "RCM"), one aspect that has renewed scrutiny in IEEE 802.11bh and 802.11bi is the rotation of a MAC address of an access point (AP) (i.e., rotation of an AP MAC address, referred to as "AP RCM") used by its wireless/radio interface to communicate with wireless stations ("STAs") or client devices, and which serves as a basic service set (BSS) identifier (ID) (BSSID). The STAs use the BSSID to identify and send frames to the AP, and to associate to the AP. STAs also use the BSSID as an indicator (in beacon frames) that the AP is present.

When the AP suddenly rotates or changes its current BSSID to a new BSSID, the STAs no longer know where to send their frames, and no management communication is possible between the AP and the STAs. The result is a disruptive automatic disassociation or disconnection of all of the STAs from the AP. In an environment, such as a busy airport, in which the AP RCM disconnects hundreds of associated STAs from the AP at the same time, all of the STAs initiate environment scans and attempt to reassociate to the new BSSID simultaneously. This consumes considerable airtime, causes excessive load on the AP, and reassociation under these conditions may take an excessively long time, which frustrates users who do not have Wi-Fi access during the long reassociation.

DESCRIPTION OF EXAMPLE EMBODIMENTS

Overview

In an embodiment, a method is performed by an access point configured with a first basic service set identifier (BSSID). The method comprises: performing an association process by which one or more wireless stations wirelessly associate to the access point using the first BSSID; and while the one or more wireless stations remain associated to the access point: sending, to the one or more wireless stations, a protected management frame configured to indicate that the access point will rotate from the first BSSID to a second BSSID configured on the access point; after sending, rotating from the first BSSID to the second BSSID while maintaining continuity of association to the one or more wireless stations; and after rotating, communicating with the one or more wireless stations using the second BSSID.

Example Embodiments

Figure 1:
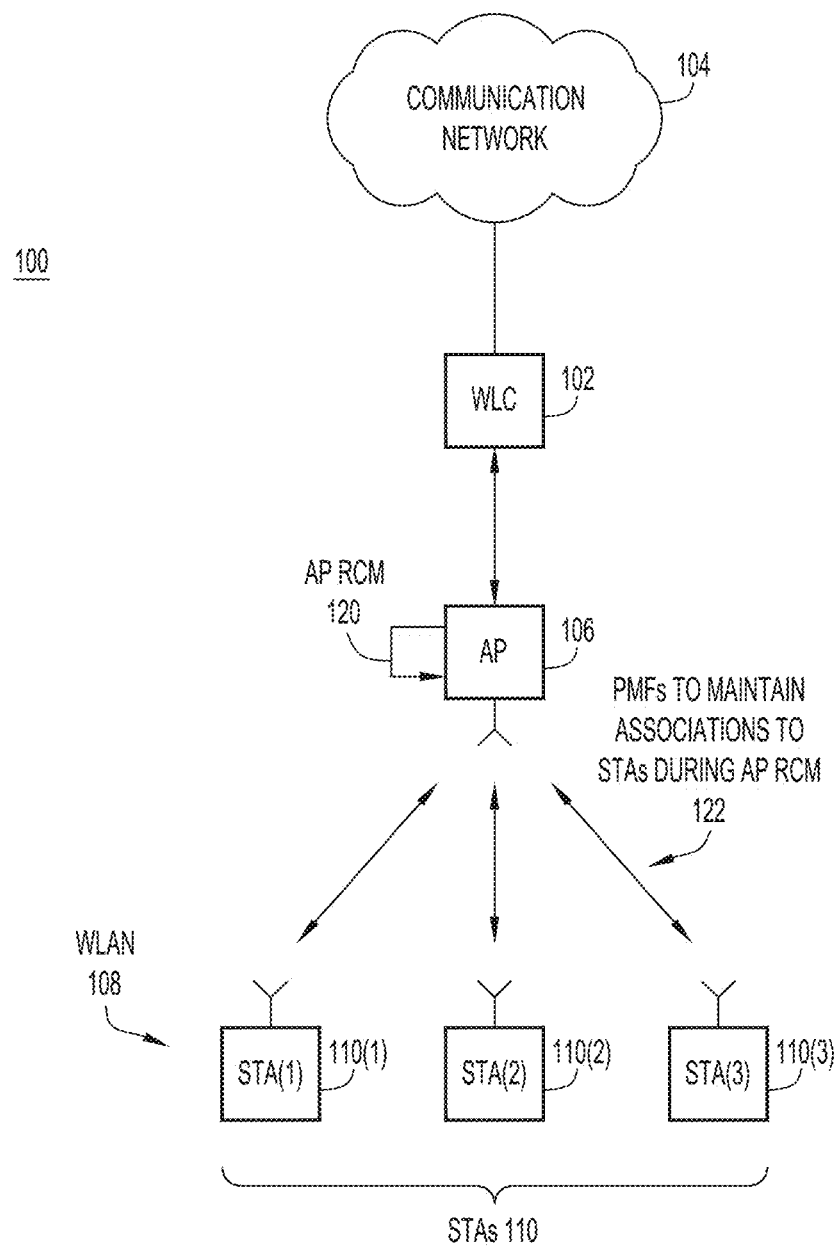
FIG. 1 is block diagram of a network environment in which a wireless AP may rotate its AP MAC address/BSSID (i.e., perform "AP RCM") while maintaining association continuity with one or more associated STAs, accordance to an example embodiment.

With reference to FIG. 1, there is a block diagram of an example network environment 100 in which an AP may rotate its AP MAC address/BSSID while maintaining association continuity with one or more associated STAs. Network environment 100 includes a wireless local area network (LAN) (WLAN) controller (WLC) 102 that is connected to and communicates with a communication network 104. Network 104 may include one or more wide area networks (WANs), such as the Internet, and one or more LANs. WLC 102 also communicates with and controls a wireless AP 106, which serves a WLAN 108 to which STAs 110(1)-110(3) (collectively referred to as "STAs 110") belong. STAs 110(1)-110(3) are also denoted "STA(1)-STA(3)" in FIG. 2, and are sometimes referred to as "wireless client devices" or simply "wireless clients." In other examples, more than one AP and more or less than three STAs may be present.

WLC 102 serves as a bridge to transport traffic (e.g., data packets) between network 104 and WLAN 108. Together, WLC 102 and AP 106 represent a wireless infrastructure. AP 106 provides wireless connectivity to STAs 110, which access WLC 102 and network 104 through the AP. STAs 110 associate to AP 106 in order to establish communication sessions with the wireless infrastructure and exchange frames (including traffic data and management frames) with the AP. Once associated to AP 106, STAs 110 may exchange traffic (e.g., data packets) with network 104 through AP 106 and WLC 102 during communication sessions, in which case the WLC forwards the traffic between the network and STAs 110.

According to embodiments presented herein, while STAs 110 are/remain associated to AP 106, the AP may rotate its MAC address (i.e., perform AP RCM), as indicated at 120. While performing the AP RCM, AP 106 exchanges, with STAs 110, protected management frames (PMFs) 122 configured to ensure that continuity of association between the AP and STAs 110 is maintained, as described below.

Figure 2:
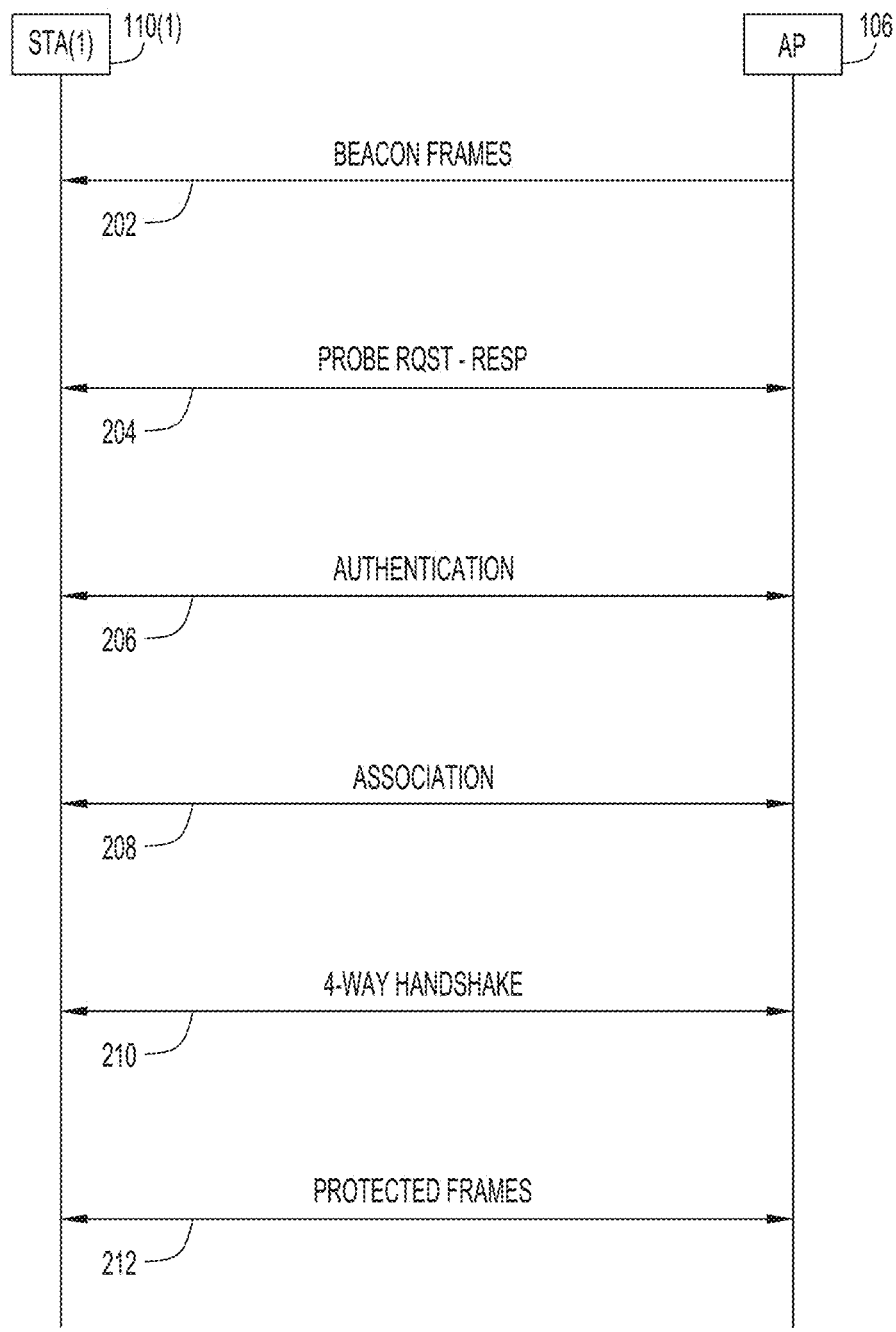
FIG. 2 is a transaction diagram showing exchanges between an AP and a STA by which the STA initially establishes an association or connection to the AP, according to an example embodiment.

FIG. 2 is a transaction diagram showing example exchanges 200 between AP 106 and any of STAs 110 (e.g., STA(1)) by which the STA establishes an association or connection to the AP, to become an "associated STA." Exchanges 200 may be in accordance with various IEEE 802.11 standards, for example.

At 202, the AP 106 periodically transmits beacon frames to announce its presence to nearby STAs (e.g., STAs 110) and relay information related to a wireless network to which the AP belongs, such as a service set identifier (ID) (SSID) of the wireless network and a BSSID configured on the AP. The BSSID represents a MAC address of the AP 106 (i.e., an AP MAC address) used by the wireless interface of the AP to communicate with STAs 110 once the STAs become associated/connected to the AP. Specifically, the AP MAC address is a MAC destination address in frames transmitted by the STAs 110 to the AP 106, and a MAC source address in frames transmitted by the AP to the STAs.

At 204, the STA(1) transmits probe requests to discover nearby wireless networks and advertise supported data rates. In response, the AP 106 transmits probe responses that include the SSID and the BSSID, along with other information. At this time, a connection state of the STA(1) is unauthenticated and not yet associated. At 206, the AP 106 authenticates the STA(1) using known or hereafter developed authentication techniques. For example, the STA(1) transmits to the AP 106 an authentication request choosing the BSSID from the probe response. In response, the AP 106 transmits to the STA(1) an authentication response. After successful authentication, the connection state of the STA(1) is authenticated but not associated.

At 208, the STA(1) associates to the AP 106 using any known or hereafter developed association technique. For example, the STA(1) transmits to the AP 106 an association request. In response, the AP 106 establishes an association identifier (AID), and transmits to the STA(1) an association response that grants network access to the STA. After successful association, the connection state of the STA(1) is authenticated and associated (i.e., connected) to the AP 106. The AP 106 and its "associated" STA(1) exchange frames with each other using the BSSID as the MAC address of the AP 106. At this stage, AP 106 and the STA(1) may exchange further frames, for example, to authenticate the STA through EAP/802.1X. In other cases, the wireless infrastructure uses a passphrase configured on AP 106 and the STA(1), and the EAP/802.1X phase is unnecessary. In both cases, both AP 106 and the STA(1) have a pairwise master key (PMK), which is either derived from the passphrase, or created when the EAP/802.1X exchange concludes.

At 210, the STA(1) and the AP 106 perform the 4-way handshake (based on 802.11i, for example) to exchange security information and derive encryption keys to enable the STA and the AP to exchange encrypted or "protected" frames with each other. The 4-way handshake establishes a pairwise master keys (PMK) security association (SA) (PMKSA) in AP 106 and STA(1). After the 4-way handshake, at 212, the STA(1) and the AP 106 may exchange protected traffic including regular protected data frames and protected management frames with each other, based on the BSSID and the PMKSA.

While the STA(1) is associated to the AP 106, the AP may perform AP RCM. That is, the AP 106 may rotate its current BSSID (i.e., AP MAC address) to a new BSSID that is configured on the AP. As described above, conventional AP RCM is disruptive. That is, when the AP 106 rotates from the current BSSID to the new BSSID, the current association/connection of the STA(1) to the AP based on the current BSSID is torn down or cleared, thus forcing the AP and the STA to repeat exchanges 200 to reestablish the association and secure connection with the AP based on the new BSSID.

According to embodiments presented herein, the AP 106 may perform AP RCM to rotate from its current BSSID to a new BSSID, while maintaining association/connection continuity with one or more associated STAs. In this way, the AP 106 and the associated STAs fully bypass re-authentication, reassociation, and the repeated 4-way handshake, and simply begin communicating with each other using the new BSSID after the AP RCM. The embodiments provide a seamless handoff for the associated STAs from the current or original BSSID to the new BSSID without losing connectivity to the AP.

Various embodiments for AP RCM are described below. As mentioned above, the embodiments use exchanges of protected management frames (PMFs) between the AP 106 and STAs 110 to implement AP RCM. A protected management frame (PMF) is a management frame that is protected by encryption, e.g., as described in 802.11w. Thus, by way of example, the protected management frames may be similar to those defined under the 802.11 standards, but extended or modified as described herein to implement features of the embodiments. For example, the PMFs may include (i) a protected management action frame (also referred to simply as an "action frame") modified for AP RCM as described herein, (ii) a protected management trigger frame (also referred to simply as a "trigger frame") modified for AP RCM as described herein, and (iii) protected BSSID transition management frames modified for AP RCM as described herein.

Figure 3:
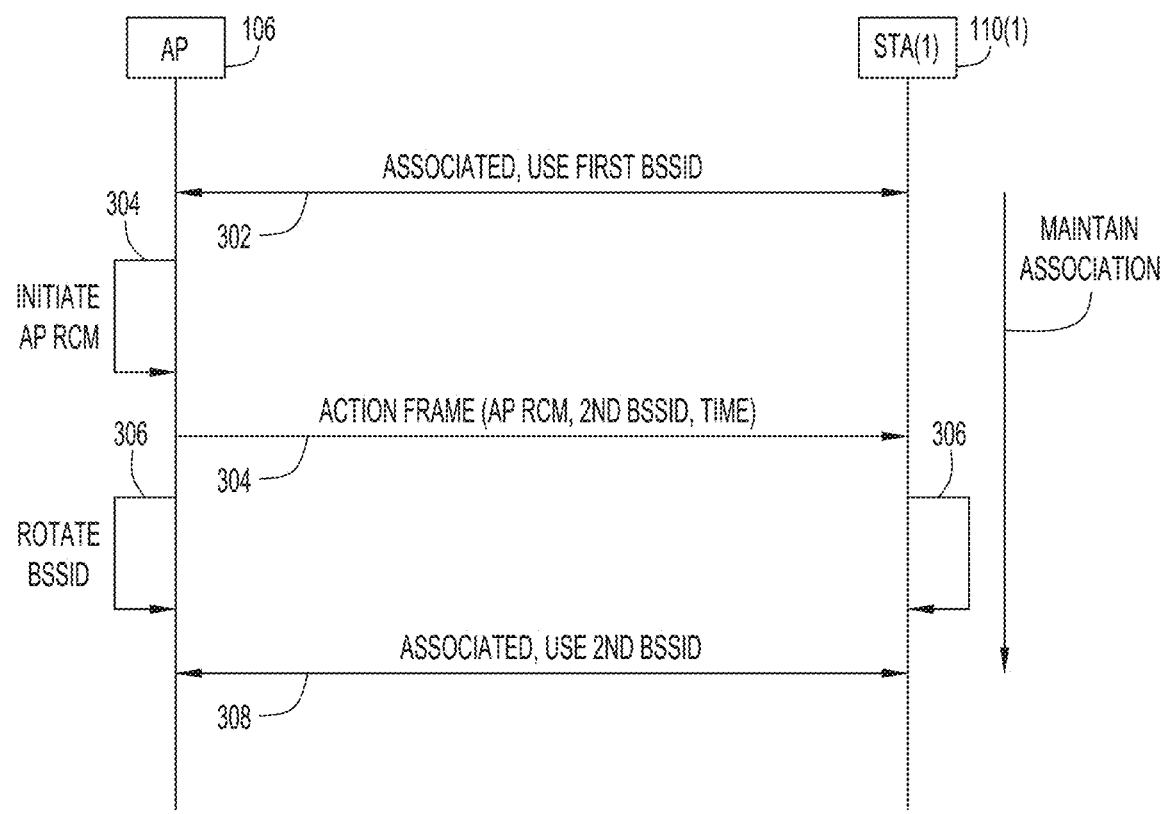
FIG. 3 is a transaction diagram showing transactions by which an AP performs RCM (i.e., AP RCM) while maintaining continuity of association with an associated STA, according to an example first embodiment.

FIG. 3 is a transaction diagram showing example transactions 300 by which AP 106 performs RCM (i.e., AP RCM) while maintaining continuity of association with an associated STA (e.g., STA(1)), according to a first embodiment.

Initially, at 302, the AP 106 is configured with a first or current BSSID, which is activated on, or being used by, the AP. The STA(1) is associated/connected to the AP 106 based on the first BSSID, which is therefore instantiated/activated on the associated STA, and being used by the STA and the AP to communicate with each other. In other words, the connection state on each of the AP 106 and the STA(1) includes the first BSSID as the AP MAC address. The association/connection may have been established based on exchanges 200 using the first BSSID, as described above. The STA(1) and the AP 106 exchange frames using the first BSSID.

Next operations 304 and 306 implement AP RCM and are performed while the STA(1) remains associated to the AP 106. That is, next operations 304 and 306 maintain continuity of the association/connection between the AP 106 and the STA(1).

At 304, the AP 106 initiates AP RCM to rotate from the first BSSID to a second or new BSSID configured on the AP. The AP 106 transmits an individually addressed protected management action frame (i.e., "action frame") to the associated STA(1) to indicate the AP RCM, i.e., to indicate that the AP will rotate from the first BSSID to the second BSSID. The action frame informs the STA(1) of the imminent AP RCM and thus provides an early warning to the STA. The action frame may be considered as a "new AP MAC address/BSSID warning" message. The action frame further indicates a future time when the AP 106 will actually rotate to/activate the second BSSID, and begin using the same to communicate with the STA(1). The future time may include a "time-to-activation" value, and may be implemented using a timer set to expire after the time activation value. The AP 106 maintains the existing association/connection to the STA(1). The STA(1) receives the action frame, recognizes the AP RCM indication, and records the second BSSID and the future time.

At 306, when the future time occurs, the AP 106 rotates to the second BSSID, which becomes active in the AP (as a current BSSID). Similarly, when the future time occurs, the STA(1) activates the second BSSID, i.e., switches from using the first BSSID to using the second BSSID as the AP MAC address.

At 308, the AP 106 and the STA(1) continue to communicate with each other over their existing connection, but using the second BSSID as the AP MAC address instead of using the first BSSID as the AP MAC address.

Figure 4:
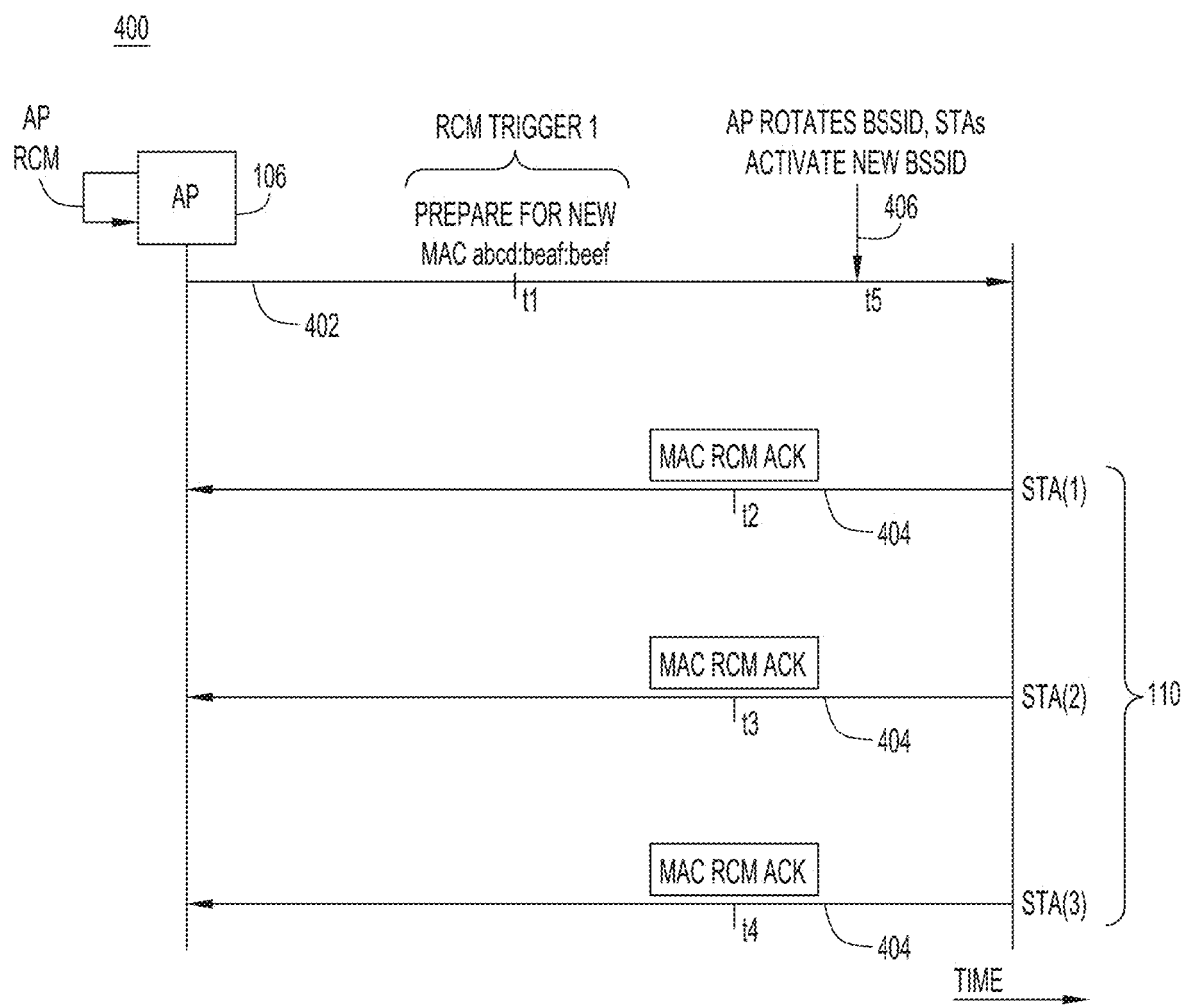
FIG. 4 is a transaction diagram showing transactions by which an AP performs RCM while maintaining continuity of association with one or more associated STAs, according to an example second embodiment.

FIG. 4 is a transaction diagram showing example transactions 400 by which AP 106 performs RCM while maintaining continuity of association with one or more of associated STAs 110, according to a second embodiment. Initial conditions for the AP 106 and each of the associated STAs 110 are as described above in connection with operation 302 of FIG. 3.

At 402, at a time t1, the AP 106 transmits to all or a subset (i.e. some but not all) of the (associated) STAs 110 a first protected management trigger frame (i.e., a "first trigger frame," denoted "RCM trigger 1" in FIG. 4). The first trigger frame is configured to indicate an AP RCM event, i.e., that the AP will rotate from the first BSSID to the second BSSID. The first trigger frame includes the future time when the AP 106 will rotate to the second BSSID (e.g., to AP MAC address abcd:beaf.beef, in FIG. 4). The first trigger frame solicits/requests a form of acknowledgement (ACK) from each STA that receives and recognizes the first trigger frame. The first trigger frame may be a unicast frame, sent individually to each STA. Alternatively, the first trigger frame may be a broadcast frame (i.e., include a broadcast MAC address) heard and recognized by all of the (associated) STAs 110. Alternatively, the first trigger frame may include an address label that identifies a constellation or group (i.e., a subset) of all of the STAs 110, in which case only the subset of the STAs recognize the first trigger frame. After sending the first trigger frame, the AP 106 waits for acknowledgements expected from the STAs 110.

Upon receiving the first trigger frame and recognizing the AP RCM indicator in the first trigger frame, each of the STAs 110 records the second BSSID and the future time. Also, at 404, at times t2-t4, the STAs 110 send to the AP 106 respective acknowledgements (each denoted "MAC RCM ACK" in FIG. 4) that the STAs received the first trigger frame.

Upon/after receiving all of the expected acknowledgements and when the future time occurs (at t5), at 406, the AP 106 rotates to the second BSSID, which becomes active in the AP (as the BSSID). Similarly, when the future time occurs, each of the STAs 110 activates the second BSSID, i.e., switches from using the first BSSID to using the second BSSID as the AP MAC address.

Figure 5:
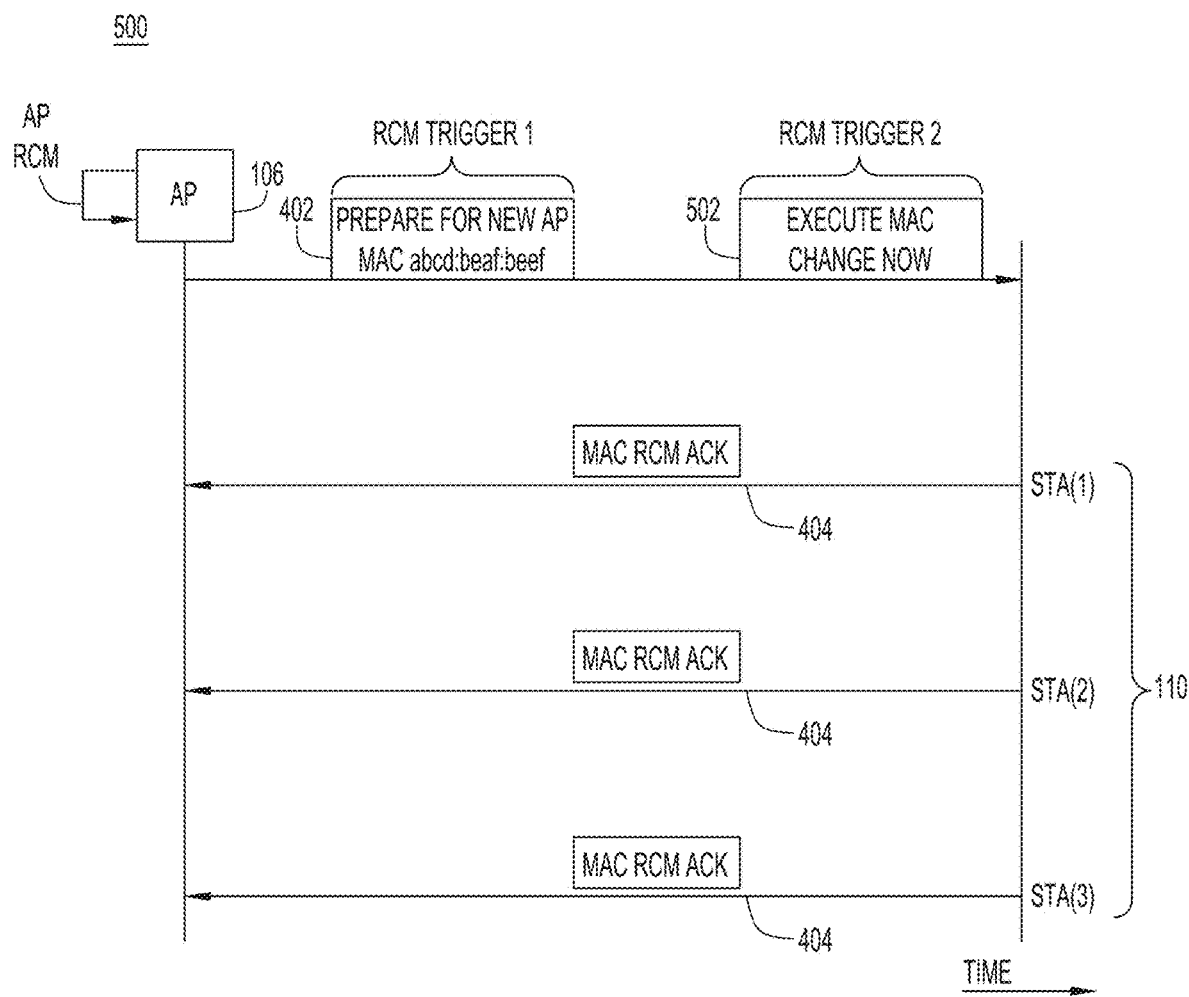
FIG. 5 is a transaction diagram showing transactions by which an AP performs RCM while maintaining continuity of association with one or more associated STAs, according to an example third embodiment.

FIG. 5 is a transaction diagram showing example transactions 500 by which AP 106 performs RCM while maintaining continuity of association with one or more of associated STAs 110, according to a third embodiment. The third embodiment is similar to the second embodiment, except for differences described below. Initial conditions are as described above in connection with operation 302 of FIG. 3.

At 402, as described above, AP 106 sends the first trigger frame to the STAs 110. At 404, as described above, the STAs respond with their respective acknowledgements.

Upon/after receiving all of the expected acknowledgements, at 502, AP 106 sends to the STAs 110 a second (protected management) trigger frame configured to command the STAs to start using the second BSSID previously sent in the first trigger frame, i.e., commanding the STAs to execute the AP MAC change immediately. The second trigger frame may include the MAC broadcast address mentioned above, or may include multiple individually addressed trigger frames. At this time, the AP 106 rotates to the second BSSID and begins using it in communications with the STAs 110. Upon receiving and recognizing the second trigger frame, each of the STAs 110 activates the second BSSID for use in communications with the AP 106. Once all of the STAs 110 have migrated to the second BSSID, the first BSSID will no longer be advertised after a configurable (or random) interval, during which new associations to the first BSSID may be declined.

Figure 6:
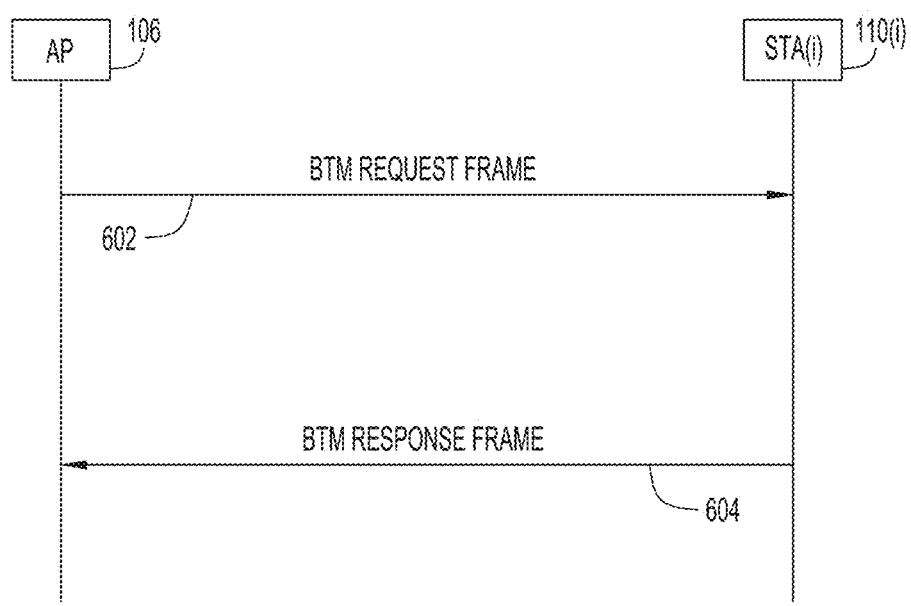
FIG. 6 is a transaction diagram showing transactions by which an AP performs RCM while maintaining continuity of association with one or more associated STAs, according to an example fourth embodiment.

FIG. 6 is a transaction diagram showing example transactions 600 by which AP 106 performs RCM while maintaining continuity of association with one or more of associated STAs 110 (e.g., STA(i)), according to a fourth embodiment. The fourth embodiment employs protected BSSID transition management frames to enable AP 106 to signal to attached stations STAs 110 the second (new) BSSID and enable an efficient, minimized, secure reassociation to the second BSSID. The AP 106 is configured with the second (new) BSSID for the current SSID (or multiple second (new) BSSIDs when the SSID spans multiple bands), and starts advertising the second BSSID via beacon frames and probe responses.

At 602, the AP 106 sends an unsolicited individually addressed protected BSSID transition management (BTM) request frame to all STAs 110 associated to the first BSSID. This frame signals to each STA 110(i) that the current basic service set (BSS) will be terminated, and (ii) to transition to the new BSSID in x target beacon transmission times (TBTTs) xTBTTs—for BSS MAC address rotation. The BTM request frame includes the following settings:
a. Preferred candidate list=1.
b. Abridge bit=1.
c. BSS termination included=1.
d. Disassociation timer=(xTBTTs).
e. Neighbor report with new BSSID and optional supplement ID 3 "BSS termination preference."
f. Vendor specific information="BSS/AP MAC rotation."

Upon receiving and recognizing the BTM request frame, at 604, each STA 110(i) responds to the AP 106 by sending a BTM response frame, which includes the following settings:
a. BTM status code "accept."
b. Target BSSID="new BSSID."
c. Vendor specific information=PMKID from current association and optionally STA new MAC address if changing.

Normally, upon association to the second (new) BSSID, to which each STA(i) has had no prior connection, there is no PMKSA cached in the STA because the 4-way handshake has yet to be performed for the second BSSID, and thus each STA would proceed through a full authentication process. In this case, however, because the second BSSID is configured on the same AP as the first BSSID, full authentication can be shortened. To make the BSSID transition to the new BSSID faster, each STA may command the AP 106 to use its current PMKID (that was used previously with the first BSSID) for the association to the second BSSID. The command may be implemented using an in-band signaling mechanism for PMKSA caching. As a result, the AP uses its current PMKID and PMKSA.

Optionally, if a STA decides to rotate its MAC address, too, the STA can include its new MAC address in the BTM response frame. This allows the AP 106 to identify the new MAC address as belonging to the STA, and to use the same PMKID as before, which allows both the AP and the STA to use their respective MAC addresses while maintaining the current connection state.

When the STA does not support BTM frames, or does not support AP RCM as described above, the AP 106 may issue another BTM request with the disassociation imminent timer=1, and subsequently disable the BSSID, thereby disconnecting the STA.

Figure 7A:
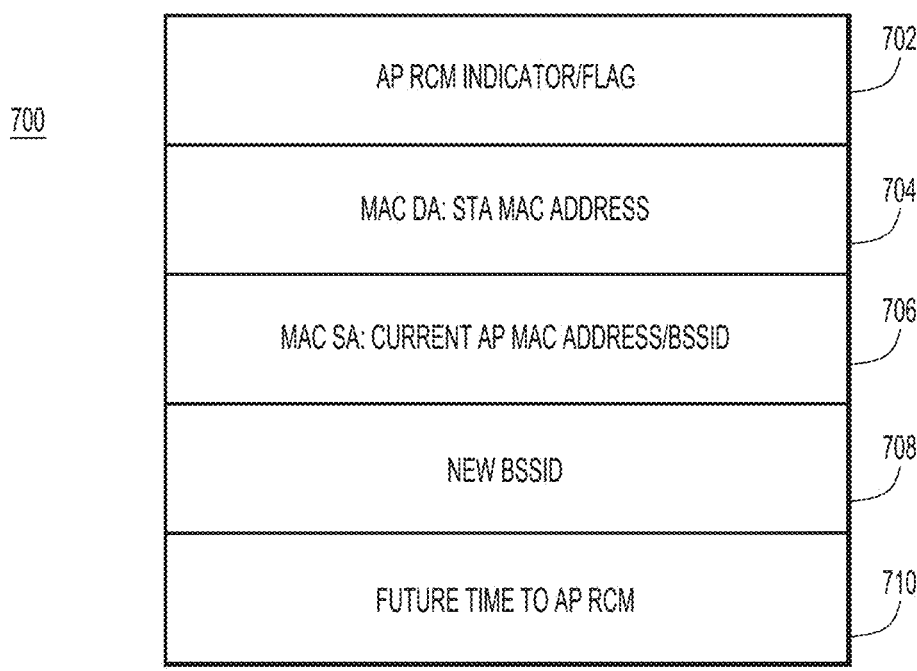
FIG. 7A is an illustration of a protected management frame (PMF) used in AP RCM, according to an example embodiment.

With reference to FIG. 7A, there is an illustration of an example protected management frame (PMF) 700 that may be used in the embodiments described above. More or less fields may be included in PMF 700. PMF 700 may be configured as an action frame for the first embodiment, and as a first trigger frame for the second and third embodiments. PMF 700 includes an AP RCM indicator or flag 702 to indicate that the PMF relates to an imminent AP RCM, a MAC destination address (DA) 704 set to a STA MAC address, a MAC source address (SA) 706 set to a current AP MAC address/BSSID, a new AP MAC address/BSSID 708, and a future time 710 at which the AP RCM activates. Future time 710 is optional for the third embodiment, since the AP issues a second trigger frame to activate the new BSSID.

Figure 7B:
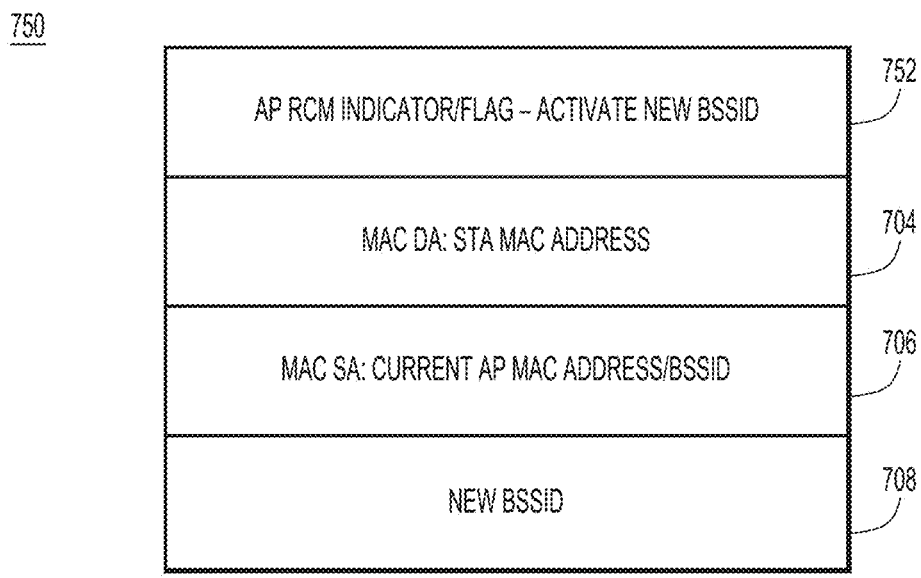
FIG. 7B is an illustration of a PMF that serves as a second trigger frame, according to an example embodiment.

With reference to FIG. 7B, there is an illustration of an example PMF 750 that serves as a second trigger frame used in the third embodiment. More or less fields may be included in PMF 750. PMF 750 includes an "AP RCM—activate new BSSID" indicator 752 to indicate that receipt of the second trigger frame should result in activating the second (new) BSSID. PMF 750 also includes fields 704-708 described in connection with FIG. 7A.

Figure 8:
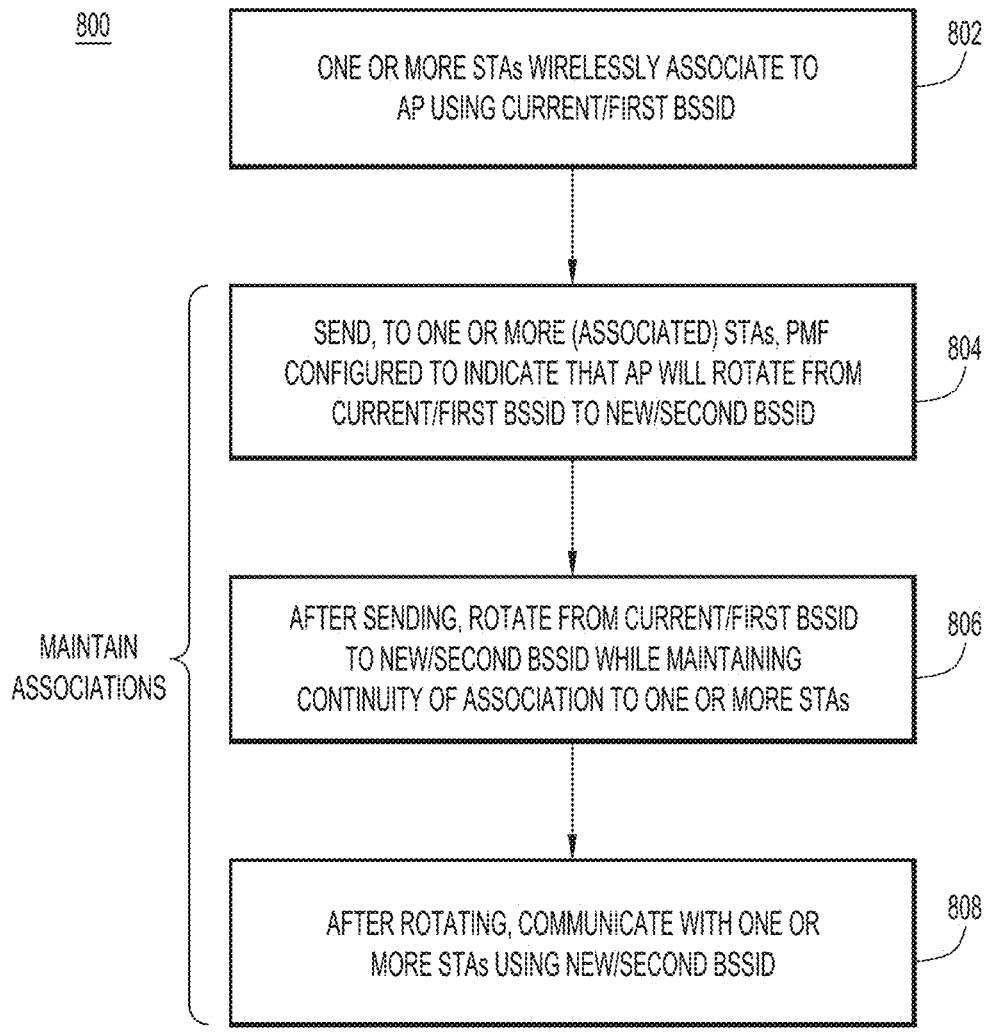
FIG. 8 is a high-level flowchart of a method of performing AP RCM while maintaining continuity of association to one or more associated STAs, according to an embodiment.

With reference to FIG. 8, there is a high-level flowchart of an example method 800 by which an AP performs AP RCM while maintaining continuity of association to one or more associated STAs. Method 800 includes various operations described above. Method 800 may be performed in accordance with one or more Wi-Fi standards modified to implement the various embodiments presented herein.

At 802, an AP (e.g., AP 106) configured with a first BSSID wirelessly authenticates one or more STAs (e.g. one or more of STAs 110). The one or more STAs then associate to the AP using the first BSSID as an AP MAC address. That is, the AP supports or performs an association process (e.g., exchanges association request and response frames) with each of the one or more STAs by which each of the one or more STAs associates to (i.e., establishes an association with) the AP. The AP also performs a 4-way handshake with the one or more STAs. After successfully completing the associating process, authenticating process, and the 4-way handshake, the AP exchanges protected frames with the one or more STAs using the first BSSID as the AP MAC address.

While the one or more STAs remain associated to the AP, the AP performs next operations 804-808.

At 804, the AP sends, to the one or more STAs, a PMF configured to indicate that the AP will rotate from the first BSSID to a second BSSID configured on the AP.

After 804, at 806, the AP rotates its MAC address from the first BSSID to the second BSSID while maintaining continuity of association to the one or more STAs.

After 806, at 808, the AP communicates with the one or more STAs using the second BSSID instead of the first BSSID.

The PMF may be configured as an action frame that further indicates a future time when the AP will rotate from the first BSSID to the second BSSID, and the AP may rotate to the second BSSID when the future time occurs.

The PMF may be configured as a trigger frame to indicate the second BSSID and to solicit an acknowledgement. Upon receiving the acknowledgement from each of the one or more STAs, i.e., when all of the acknowledgements are received, the AP may rotate to the second BSSID. Alternatively, upon receiving the acknowledgement from each of the one or more STAs, the AP may send, to the one or more STAs, a second PMF configured as a second trigger frame to trigger activation of the second BSSID in the one or more STAs. In other embodiments, the AP may rotate to the second BSSID when at least one (not necessarily all) of the acknowledgements is received.

In another embodiment, prior to sending the PMF, the AP may advertise the second BSSID to the one or more STAs, and then send the PMF as a protected management request frame (e.g., a BTM request frame). Upon receiving a protected management response frame (e.g., a BTM response frame) indicating acceptance of the second BSSID from each of the one or more STAs, the AP may rotate to the second BSSID.

In method 800, a particular STA of the one or more STAs may perform:
a. Wirelessly associating to the AP based on the first BSSID.
b. While the particular STA remains associated to the access point:
  i. Receiving, from the access point, the PMF sent by the AP at 804.
  ii. After receiving the PMF, activating the first BSSID while maintaining the continuity of the association to the AP.
  iii. After activating, communicating with the access point using the second BSSID.

In summary, according to the embodiments presented herein, an AP rotates its MAC address (which may be a natural result for mobile APs and virtual APs, for example), which is instantiated on STAs that were associated to the AP prior to the rotation. The embodiments allow the AP to rotate its MAC address without losing association continuity to the STAs. For example, one embodiment uses an initial or first trigger frame transmitted from the AP to the STAs informing the STAs (i) that an AP MAC rotation is about to occur, and (ii) which (new) AP MAC address/BSSID to use. A second trigger frame informs all of the STAs of the moment that the AP MAC address/BSSID has changed, allowing continuity of association for all of the STAs.

Figure 9:
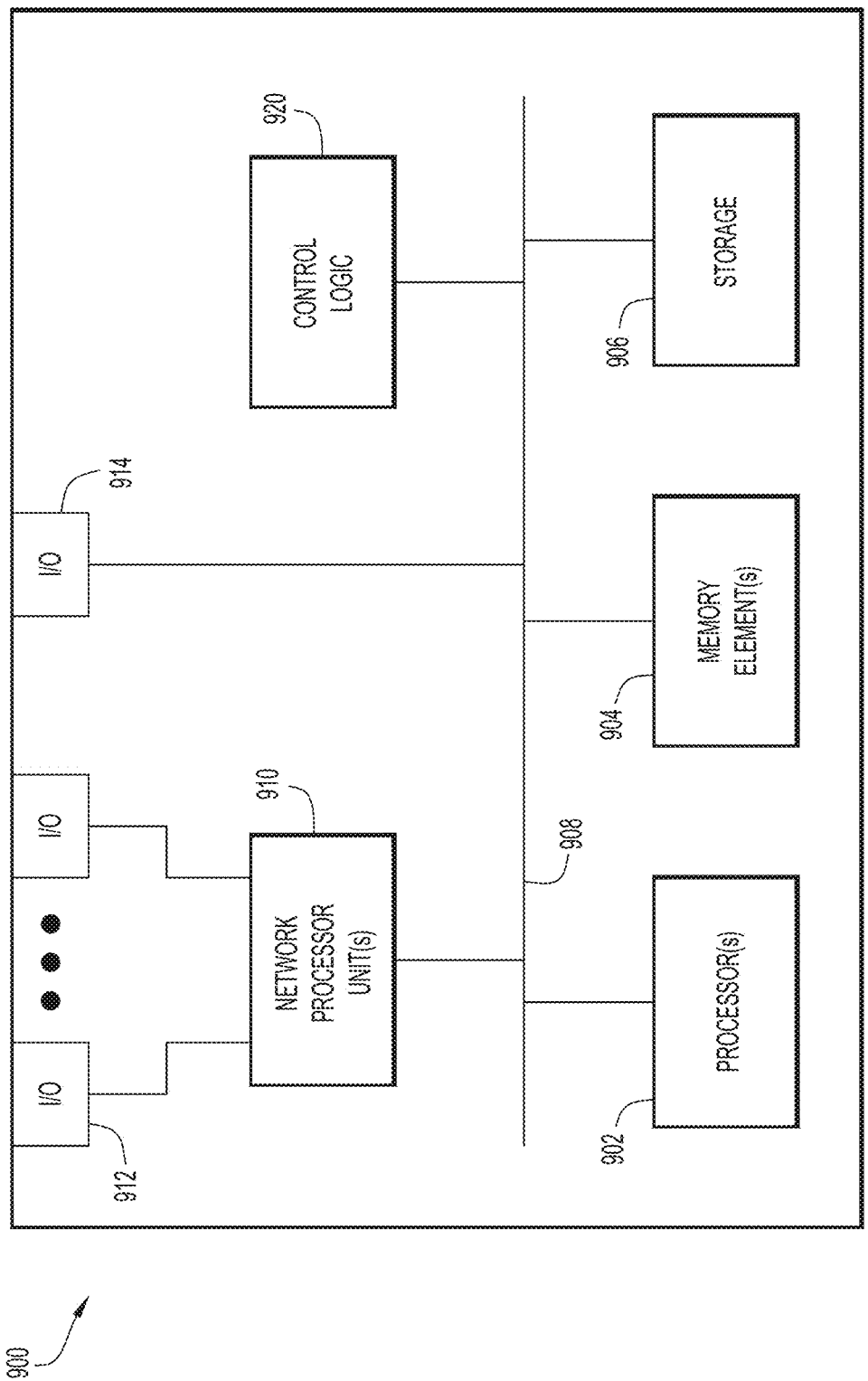
FIG. 9 is a hardware block diagram of a device that may perform functions associated with operations discussed herein, according to an example embodiment.

Referring to FIG. 9, FIG. 9 illustrates a hardware block diagram of a computing device 900 that may perform functions associated with operations discussed herein in connection with the techniques depicted in FIGS. 1-8 In various embodiments, a computing device or apparatus, such as computing device 900 or any combination of computing devices 900, may be configured as any entity/entities as discussed for the techniques depicted in connection with FIGS. 1-8 in order to perform operations of the various techniques discussed herein. For example, computing device 900 may represent AP 106 and/or each of STAs 110.

In at least one embodiment, the computing device 900 may be any apparatus that may include one or more processor(s) 902, one or more memory element(s) 904, storage

906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at an access point configured with a first basic service set identifier (BSSID): performing an association process by which one or more wireless stations wirelessly associate to the access point using the first BSSID; and while the one or more wireless stations remain associated to the access point: sending, to the one or more wireless stations, a protected management frame configured to indicate that the access point will rotate from the first BSSID to a second BSSID configured on the access point; after sending, rotating from the first BSSID to the second BSSID while maintaining continuity of association to the one or more wireless stations; and after rotating, communicating with the one or more wireless stations using the second BSSID.

In some aspects, the techniques described herein relate to a method, wherein: sending includes sending the protected management frame to include a future time when the access point will rotate from the first BSSID to the second BSSID; and rotating includes rotating when the future time occurs.

In some aspects, the techniques described herein relate to a method, further including, at the access point: sending the protected management frame configured to indicate the second BSSID and to solicit an acknowledgement; and upon receiving the acknowledgement from each of the one or more wireless stations, rotating to the second BSSID.

In some aspects, the techniques described herein relate to a method, wherein: the protected management frame further indicates a future time when the access point will rotate from the first BSSID to the second BSSID; and rotating includes rotating to the second BSSID when the future time occurs.

In some aspects, the techniques described herein relate to a method, further including, at the access point: upon receiving the acknowledgement to the protected management frame from each of the one or more wireless stations, sending, to the one or more wireless stations, a second protected management frame configured to trigger activation of the second BSSID in the one or more wireless stations.

In some aspects, the techniques described herein relate to a method, further including: prior to sending the protected management frame, advertising the second BSSID to the one or more wireless stations; sending the protected management frame as a protected management request frame; and upon receiving a protected management response frame indicating acceptance of the second BSSID from each of the one or more wireless stations, rotating to the second BSSID.

In some aspects, the techniques described herein relate to a method, wherein the protected management frame is one of a protected management action frame and a protected management trigger frame according to one or more Wi-Fi standards.

In some aspects, the techniques described herein relate to a method, including, at a particular wireless station of the one or more wireless stations: wirelessly associating to the access point based on the first BSSID; and while the particular wireless station remains associated to the access point: receiving, from the access point, the protected management frame; after receiving, activating the first BSSID while maintaining the continuity of the association to the access point; and after activating, communicating with the access point using the second BSSID.

In some aspects, the techniques described herein relate to an apparatus including: one or more network input/output interfaces to communicate wirelessly; and a processor of an access point configured with a first basic service set identifier (BSSID), the processor coupled to the one or more network input/output interfaces and configured to perform operations including: performing an association process by which one or more wireless stations wirelessly associate to the access point using the first BSSID; and while the one or more wireless stations remain associated to the access point: sending, to the one or more wireless stations, a protected management frame configured to indicate that the access point will rotate from the first BSSID to a second BSSID configured on the access point; after sending, rotating from the first BSSID to the second BSSID while maintaining continuity of association to the one or more wireless stations; and after rotating, communicating with the one or more wireless stations using the second BSSID.

In some aspects, the techniques described herein relate to an apparatus, wherein the processor is configured to perform: sending by sending the protected management frame to include a future time when the access point will rotate from the first BSSID to the second BSSID; and rotating by rotating when the future time occurs.

In some aspects, the techniques described herein relate to an apparatus, wherein: the protected management frame is further configured to indicate the second BSSID and to solicit an acknowledgement; and the processor is further configured to perform, upon receiving the acknowledgement from each of the one or more wireless stations, rotating to the second BSSID.

In some aspects, the techniques described herein relate to an apparatus, wherein: the protected management frame further indicates a future time when the access point will rotate from the first BSSID to the second BSSID; and the processor is configured to perform rotating by rotating to the second BSSID when the future time occurs.

In some aspects, the techniques described herein relate to an apparatus, wherein the processor is further configured to perform: upon receiving the acknowledgement to the protected management frame from each of the one or more wireless stations, sending, to the one or more wireless stations, a second protected management frame configured to trigger activation of the second BSSID in the one or more wireless stations.

In some aspects, the techniques described herein relate to an apparatus, wherein the processor is further configured to perform: prior to sending the protected management frame, advertising the second BSSID to the one or more wireless stations; sending the protected management frame as a protected management request frame; and upon receiving a protected management response frame indicating acceptance of the second BSSID from each of the one or more wireless stations, rotating to the second BSSID.

In some aspects, the techniques described herein relate to an apparatus, wherein the protected management frame is one of a protected management action frame and a protected management trigger frame according to one or more Wi-Fi standards.

In some aspects, the techniques described herein relate to a non-transitory computer readable medium encoded with instructions that, when executed by a processor of an access point configured with a first basic service set identifier (BSSID), cause the processor to perform operations including: performing an association process by which one or more wireless stations wirelessly associate to the access point using the first BSSID; and while the one or more wireless stations remain associated to the access point: sending, to the one or more wireless stations, a protected management frame configured to indicate that the access point will rotate from the first BSSID to a second BSSID configured on the access point; after sending, rotating from the first BSSID to the second BSSID while maintaining continuity of association to the one or more wireless stations; and after rotating, communicating with the one or more wireless stations using the second BSSID.

In some aspects, the techniques described herein relate to a non-transitory computer readable medium, wherein: the instructions to cause the processor to perform sending include instructions to cause the processor to perform sending the protected management frame to include a future time when the access point will rotate from the first BSSID to the second BSSID; and the instructions to cause the processor to perform rotating include instructions to cause the processor to perform rotating when the future time occurs.

In some aspects, the techniques described herein relate to a non-transitory computer readable medium, further including instructions to cause the processor to perform: sending the protected management frame configured to indicate the second BSSID and to solicit an acknowledgement; and upon receiving the acknowledgement from each of the one or more wireless stations, rotating to the second BSSID.

In some aspects, the techniques described herein relate to a non-transitory computer readable medium, wherein: the protected management frame further indicates a future time when the access point will rotate from the first BSSID to the second BSSID; and the instructions to cause the processor to perform rotating include instructions to cause the processor to perform rotating to the second BSSID when the future time occurs.

In some aspects, the techniques described herein relate to a non-transitory computer readable medium, further including instructions to cause the processor to perform: upon receiving the acknowledgement to the protected management frame from each of the one or more wireless stations, sending, to the one or more wireless stations, a second protected management frame configured to trigger activation of the second BSSID in the one or more wireless stations.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at an access point configured with a first basic service set identifier (BSSID):
performing an association process by which one or more wireless stations wirelessly associate to the access point using the first BSSID, and a security handshake by which the one or more wireless stations wirelessly exchange one or more keys with the access point; and
after completing the association process and the security handshake, and while the one or more wireless stations remain associated to the access point:
sending, to the one or more wireless stations, a protected management frame PMF), which serves as a trigger frame, configured with a future time value that indicates when the access point will rotate from the first BSSID to a second BSSID configured on the access point, and further configured to solicit an acknowledgement;
upon receiving the acknowledgement from the one or more wireless stations, and when the future time value occurs, rotating from the first BSSID to the second BSSID while maintaining continuity of association to the one or more wireless stations; and
after rotating, communicating with the one or more wireless stations using the second BSSID, wherein the first BSSID and the second BSSID each represents a respective media access control (MAC) address of the access point that serves as an access point MAC source address in first frames transmitted by the access point to the one or more wireless stations, and as an access point MAC destination address in second frames transmitted by the one or more wireless stations to the access point.

2. The method of claim 1, further comprising:
implementing the future time value using a timer that is set to expire after a time-to-activation value.

3. The method of claim 1, wherein:
the protected management frame is further configured with a broadcast MAC address recognized by all of the one or more wireless stations.

4. The method of claim 1, wherein:
the protected management frame includes a randomized and changing media access control (MAC) address indicator to indicate that the protected management frame relates to randomized and changing MAC address.

5. The method of claim 1, further comprising, at the access point:

after completing the association process and the security handshake, upon receiving the acknowledgement to the protected management frame from each of the one or more wireless stations, sending, to the one or more wireless stations, a second protected management frame configured to trigger activation of the second BSSID in the one or more wireless stations.

6. The method of claim 1, further comprising:
prior to sending the protected management frame, advertising the second BSSID to the one or more wireless stations;
sending the protected management frame as a protected management request frame; and
upon receiving a protected management response frame indicating acceptance of the second BSSID from each of the one or more wireless stations, rotating to the second BSSID.

7. The method of claim 1, wherein the protected management frame is one of a protected management action frame and a protected management trigger frame according to one or more Wi-Fi standards.

8. The method of claim 1, further comprising, at a particular wireless station of the one or more wireless stations:
wirelessly associating to the access point based on the first BSSID;
while the particular wireless station remains associated to the access point:
receiving, from the access point, the protected management frame; and
after receiving, activating the first BSSID while maintaining the continuity of the association to the access point; and
after activating, communicating with the access point using the second BSSID.

9. An apparatus comprising:
one or more network input/output interfaces to communicate wirelessly; and
a processor of an access point configured with a first basic service set identifier (BSSID), the processor coupled to the one or more network input/output interfaces and configured to perform operations including:
performing an association process by which one or more wireless stations wirelessly associate to the access point using the first BSSID, and a security handshake by which the one or more wireless stations wirelessly exchange one or more keys with the access point; and
after completing the association process and the security handshake, and while the one or more wireless stations remain associated to the access point:
sending, to the one or more wireless stations, a protected management frame (PMF), which serves as a trigger frame, configured with a future time value that indicates when the access point will rotate from the first BSSID to a second BSSID configured on the access point, and further configured to solicit an acknowledgement;
upon receiving the acknowledgement from the one or more wireless stations, and when the future time value occurs, rotating from the first BSSID to the second BSSID while maintaining continuity of association to the one or more wireless stations; and
after rotating, communicating with the one or more wireless stations using the second BSSID, wherein the first BSSID and the second BSSID each represents a respective media access control (MAC) address of the access point that serves as an access point MAC source address in first frames transmitted by the access point to the one or more wireless stations, and as an access point MAC destination address in second frames transmitted by the one or more wireless stations to the access point.

10. The apparatus of claim 9, wherein:
the processor is configured to perform implementing the future time value using a timer that is set to expire after a time-to-activation value.

11. The apparatus of claim 9, wherein:
the protected management frame is further configured with a broadcast MAC address recognized by all of the one or more wireless stations.

12. The apparatus of claim 9, wherein:
the protected management frame includes a randomized and changing media access control (MAC) address indicator to indicate that the protected management frame relates to randomized and changing MAC address.

13. The apparatus of claim 9, wherein the processor is further configured to perform:
after completing the association process and the security handshake, upon receiving the acknowledgement to the protected management frame from each of the one or more wireless stations, sending, to the one or more wireless stations, a second protected management frame configured to trigger activation of the second BSSID in the one or more wireless stations.

14. The apparatus of claim 9, wherein the processor is further configured to perform:
prior to sending the protected management frame, advertising the second BSSID to the one or more wireless stations;
sending the protected management frame as a protected management request frame; and
upon receiving a protected management response frame indicating acceptance of the second BSSID from each of the one or more wireless stations, rotating to the second BSSID.

15. The apparatus of claim 9, wherein the protected management frame is one of a protected management action frame and a protected management trigger frame according to one or more Wi-Fi standards.

16. A non-transitory computer readable medium encoded with instructions that, when executed by a processor of an access point configured with a first basic service set identifier (BSSID), cause the processor to perform operations including:
performing an association process by which one or more wireless stations wirelessly associate to the access point using the first BSSID, and a security handshake by which the one or more wireless stations wirelessly exchange one or more keys with the access point; and
after completing the association process and the security handshake, and while the one or more wireless stations remain associated to the access point:
sending, to the one or more wireless stations, a protected management frame PMF), which serves as a trigger frame, configured with a future time value that indicates when the access point will rotate from the first BSSID to a second BSSID configured on the access point, and further configured to solicit an acknowledgement;

upon receiving the acknowledgement from the one or more wireless stations, and when the future time value occurs, rotating from the first BSSID to the second BSSID while maintaining continuity of association to the one or more wireless stations; and after rotating, communicating with the one or more wireless stations using the second BSSID, wherein the first BSSID and the second BSSID each represents a respective media access control (MAC) address of the access point that serves as an access point MAC source address in first frames transmitted by the access point to the one or more wireless stations, and as an access point MAC destination address in second frames transmitted by the one or more wireless stations to the access point.

17. The non-transitory computer readable medium of claim 16, further comprising instructions to cause the processor to perform:

implementing the future time value using a timer that is set to expire after a time-to-activation value.

18. The non-transitory computer readable medium of claim 16, wherein:

the protected management frame is further configured with a broadcast MAC address recognized by all of the one or more wireless stations.

19. The non-transitory computer readable medium of claim 16, wherein:

the protected management frame includes a randomized and changing media access control (MAC) address indicator to indicate that the protected management frame relates to randomized and changing MAC address.

20. The non-transitory computer readable medium of claim 16, further comprising instructions to cause the processor to perform:

after completing the association process and the security handshake, upon receiving the acknowledgement to the protected management frame from each of the one or more wireless stations, sending, to the one or more wireless stations, a second protected management frame configured to trigger activation of the second BSSID in the one or more wireless stations.

* * * * *